United States Patent
Dave et al.

(10) Patent No.: US 10,491,499 B2
(45) Date of Patent: Nov. 26, 2019

(54) ANALYZING RESOURCE UTILIZATION OF A CLOUD COMPUTING RESOURCE IN A CLOUD COMPUTING ENVIRONMENT

(71) Applicant: Accenture Global Solutions Limited, Dublin (IE)

(72) Inventors: Parag Dave, Pune (IN); Paresh Takawale, Pune (IN); Garima Mittal, Pune (IN); Amitkumar Bangad, Pune (IN)

(73) Assignee: Accenture Global Solutions Limited, Dublin (IE)

( * ) Notice: Subject to any disclaimer, the term of this patent is extended or adjusted under 35 U.S.C. 154(b) by 82 days.

(21) Appl. No.: 15/592,902

(22) Filed: May 11, 2017

(65) Prior Publication Data
US 2018/0331928 A1    Nov. 15, 2018

(51) Int. Cl.
| | |
|---|---|
| H04L 12/26 | (2006.01) |
| G06N 20/00 | (2019.01) |
| G06N 5/04 | (2006.01) |
| H04L 29/08 | (2006.01) |
| G06F 9/50 | (2006.01) |
| G06F 9/455 | (2018.01) |

(52) U.S. Cl.
CPC ........ *H04L 43/0876* (2013.01); *G06F 9/5072* (2013.01); *G06N 5/04* (2013.01); *G06N 20/00* (2019.01); *H04L 43/16* (2013.01); *H04L 67/10* (2013.01); *G06F 9/45533* (2013.01); *G06F 2209/504* (2013.01); *G06F 2209/5019* (2013.01); *G06F 2209/5022* (2013.01)

(58) Field of Classification Search
CPC ..... H04L 43/0876; H04L 43/16; H04L 67/10; G06N 99/005; G06N 5/04; G06F 9/45533
See application file for complete search history.

(56) References Cited

U.S. PATENT DOCUMENTS

| | | |
|---|---|---|
| 8,499,066 B1 | 7/2013 | Zhang et al. |
| 2005/0172291 A1 | 8/2005 | Das et al. |

(Continued)

OTHER PUBLICATIONS

Wikipedia, "Multitenancy", https://en.wikipedia.org/wiki/Multitenancy, May 10, 2017, 5 pages.

*Primary Examiner* — Philip J Chea
*Assistant Examiner* — Wuji Chen
(74) *Attorney, Agent, or Firm* — Harrity & Harrity, LLP

(57) ABSTRACT

A device may receive information that identifies a resource utilization, by another device, of a cloud computing resource. The device may determine a current score based on the information that identifies the resource utilization and information that identifies a threshold. The current score may be indicative of the resource utilization relative to the threshold. The device may determine a prediction of a future score related to the resource utilization based on the current score and based on the threshold. The prediction of the future score may relate to satisfaction of the threshold. The device may determine a set of recommendations. The set of recommendations may be related to the resource utilization. The device may provide information that identifies the current score, the prediction of the future score, or the set of recommendations to permit or cause an action to be performed. The action may be related to the resource utilization.

20 Claims, 7 Drawing Sheets

(56) References Cited

U.S. PATENT DOCUMENTS

| | | | |
|---|---|---|---|
| 2009/0113056 A1* | 4/2009 | Tameshige | G06F 9/5011 |
| | | | 709/226 |
| 2009/0300173 A1* | 12/2009 | Bakman | G06F 11/008 |
| | | | 709/224 |
| 2010/0083248 A1* | 4/2010 | Wood | G06F 9/5077 |
| | | | 718/1 |
| 2011/0295999 A1* | 12/2011 | Ferris | G06F 9/5072 |
| | | | 709/224 |
| 2013/0086273 A1* | 4/2013 | Wray | G06F 9/5072 |
| | | | 709/226 |
| 2013/0138806 A1* | 5/2013 | Gohad | G06F 9/5072 |
| | | | 709/224 |
| 2013/0304925 A1* | 11/2013 | Ferris | G06F 9/5072 |
| | | | 709/226 |
| 2014/0282520 A1 | 9/2014 | Sabharwal | |
| 2014/0337442 A1* | 11/2014 | Zhuang | H04L 51/066 |
| | | | 709/206 |
| 2016/0034835 A1* | 2/2016 | Levi | H04L 67/10 |
| | | | 705/7.23 |
| 2016/0269239 A1* | 9/2016 | Ashby, Jr. | H04L 41/0823 |
| 2016/0344597 A1* | 11/2016 | Zhang | G06N 5/022 |
| 2017/0061352 A1 | 3/2017 | Kogut-O'Connell et al. | |
| 2018/0048532 A1* | 2/2018 | Poort | H04L 41/147 |

* cited by examiner

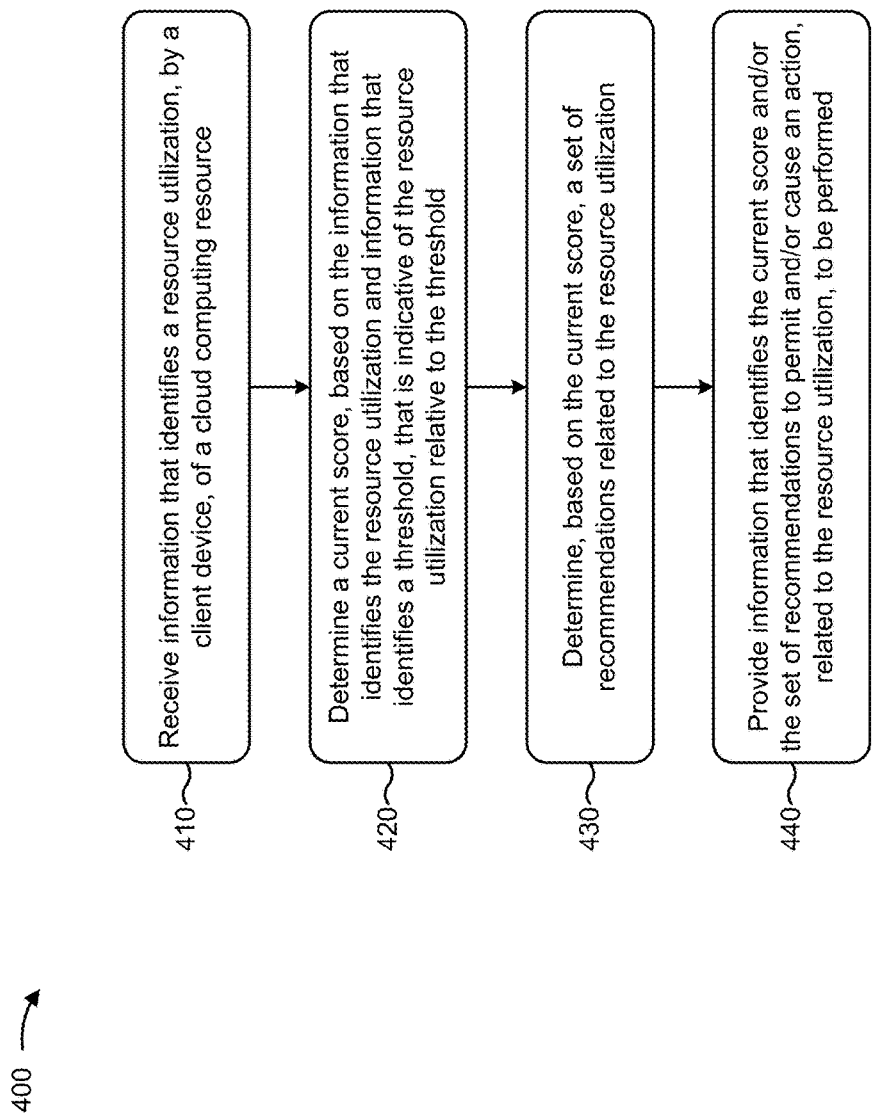

ANALYZING RESOURCE UTILIZATION OF A CLOUD COMPUTING RESOURCE IN A CLOUD COMPUTING ENVIRONMENT

BACKGROUND

Software multitenancy may include a software architecture in which a single instance of software runs on a server and serves multiple tenants. A tenant may refer to a group of users that share a common access with specific privileges to the software instance. In a multitenant architecture, a software application may be designed to provide every tenant with a dedicated share of the instance, including data, a configuration, user management, functional properties, and/or non-functional properties. Multitenancy may be contrasted with a multi-instance architecture, where separate software instances operate on behalf of different tenants. A cloud computing environment may implement a multitenant architecture or a multi-instance architecture.

SUMMARY

According to some possible implementations, a device may comprise one or more processors to receive information that identifies a resource utilization, by another device, of a cloud computing resource. The one or more processors may determine a current score based on the information that identifies the resource utilization and information that identifies a threshold. The current score may be indicative of the resource utilization relative to the threshold. The one or more processors may determine a prediction of a future score related to the resource utilization based on the current score and based on the threshold. The prediction of the future score may relate to satisfaction of the threshold. The one or more processors may determine, based on the current score and/or the prediction of the future score, a set of recommendations. The set of recommendations may be related to the resource utilization. The one or more processors may provide information that identifies the current score, the prediction of the future score, or the set of recommendations to permit or cause an action to be performed. The action may be related to the resource utilization.

According to some possible implementations, a method may comprise receiving, by a device, information that identifies a resource utilization, by another device, of a cloud computing resource. The method may comprise determining, by the device, a score based on the information that identifies the resource utilization and information that identifies a threshold. The score may indicate a likelihood that the resource utilization is to satisfy the threshold. The method may comprise determining, by the device, a set of recommendations to prevent the resource utilization from satisfying the threshold. The method may comprise providing, by the device, information that identifies the score or the set of recommendations to permit or cause an action to be performed. The action may be related to the resource utilization.

According to some possible implementations, a non-transitory computer-readable medium may store one or more instructions that, when executed by one or more processors, cause the one or more processors to receive information that identifies one or more resource utilizations, by one or more other devices, of one or more cloud computing resources. The one or more instructions, when executed by the one or more processors, may cause the one or more processors to determine one or more scores based on the information that identifies the one or more resource utilizations and information that identifies one or more thresholds related to the one or more resource utilizations. The one or more scores may be indicative of the one or more resource utilizations satisfying the one or more thresholds. The one or more thresholds may include one or more static thresholds, or one or more dynamic thresholds. The one or more instructions, when executed by the one or more processors, may cause the one or more processors to determine one or more predictions related to the one or more resource utilizations. The one or more predictions may relate to the one or more resource utilizations satisfying the one or more thresholds. The one or more instructions, when executed by the one or more processors, may cause the one or more processors to determine, based on the one or more scores or the one or more predictions, one or more recommendations related to preventing the one or more resource utilizations from satisfying the one or more thresholds. The one or more instructions, when executed by the one or more processors, may cause the one or more processors to perform one or more actions based on the one or more scores, the one or more predictions, or the one or more recommendations. The one or more actions may be related to the one or more resource utilizations.

BRIEF DESCRIPTION OF THE DRAWINGS

FIG. 4 is a flow chart of an example process for analyzing resource utilization of a cloud computing resource in a cloud computing environment.

DETAILED DESCRIPTION

Figure 1A:
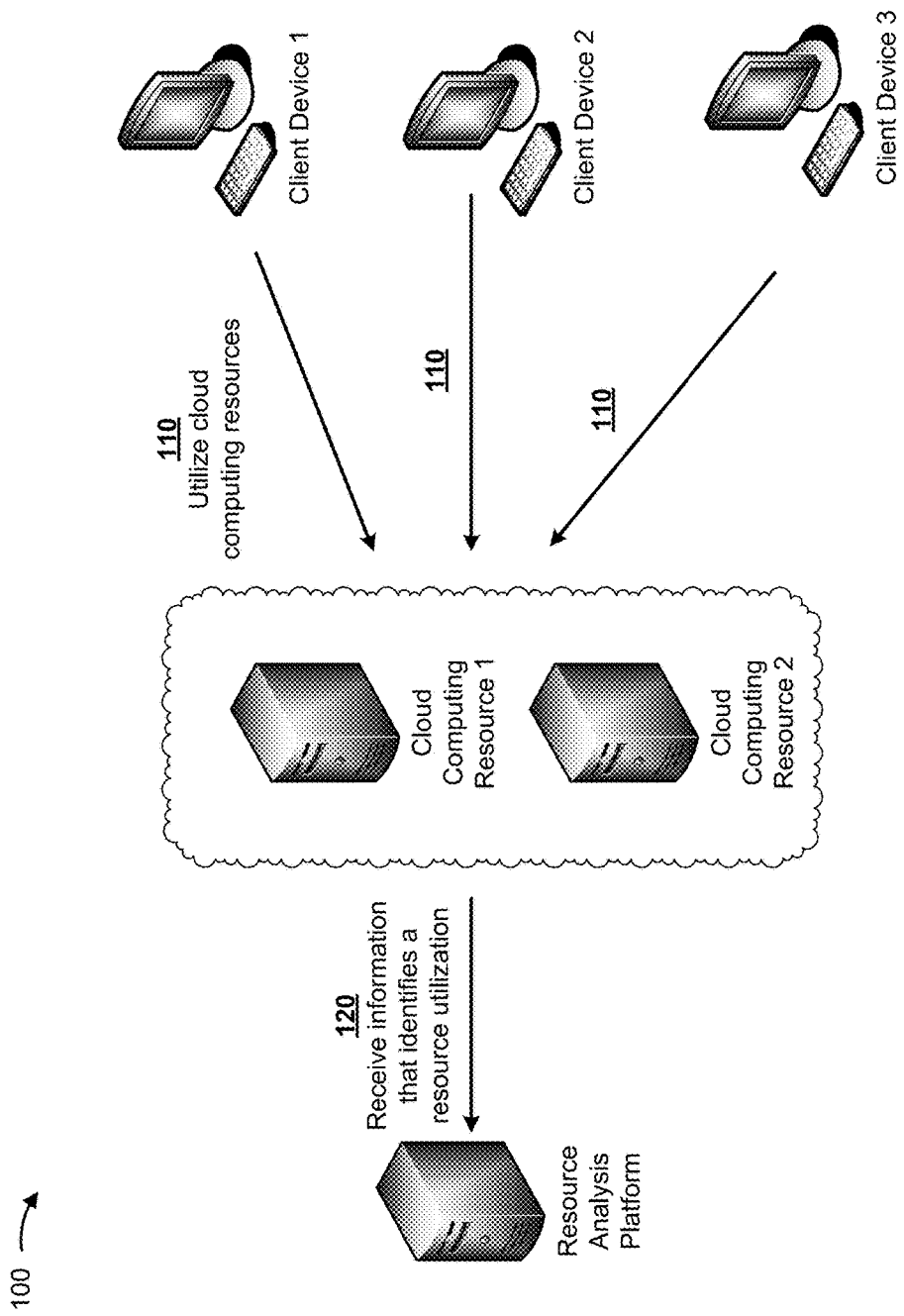
FIGS. 1A-1D are diagrams of an overview of an example implementation described herein.

The following detailed description of example implementations refers to the accompanying drawings. The same reference numbers in different drawings may identify the same or similar elements.

A Cloud Service Provider (CSP) may include an organization that provides a cloud computing resource to a client device and/or a user of a client device. The CSP may provide the cloud computing resource based on an agreement between the CSP and the user. The agreement may specify an average price that the user is to pay for the cloud computing resource. Additionally, or alternatively, the agreement may specify a threshold associated with use of the cloud computing resource (e.g., a specified amount of the cloud computing resource that the user is permitted to use, a specified rate at which the user is permitted to use the cloud computing resource, etc.).

However, the user may not be aware that the user is close to satisfying the threshold when the user is using the cloud computing resource. In addition, the user may be subject to conditions that are unfavorable if the threshold is satisfied. For example, the user may pay a greater price, for using the cloud computing resource when the threshold is satisfied, than the average price the user pays when the threshold is not satisfied. In some cases, the user may stop receiving access to the cloud computing resource when the threshold is satisfied. This can negatively impact operations of a client device that uses the cloud computing resource, negatively impact a user experience of the user, and/or the like.

Some implementations, described herein, provide a resource analysis platform that is capable of receiving information that identifies a resource utilization of a cloud computing resource, determining a current score that is indicative of the resource utilization relative to a threshold, determining a set of recommendations related to the resource utilization, and/or providing information related to the current score and/or the set of recommendations to permit and/or cause an action, related to the resource utilization, to be performed. In this way, the resource analysis platform may inform a user that the user is likely to satisfy a threshold associated with use of a cloud computing resource prior to the user satisfying the threshold.

This prevents the user from paying a greater price for using the cloud computing resource than the average price the user pays for use of the cloud computing resource and improves a user experience of a user of a client device using the cloud computing resources. Additionally, this prevents the client device from losing access to the cloud computing resource based on the threshold being satisfied, thereby reducing or eliminating interruptions to an operation of a client device that is using the cloud computing resource. Further, this conserves resources (e.g., memory resources, cloud computing resources, processing resources, etc.) of a cloud computing environment associated with the cloud computing resource by preventing the user from overusing a cloud computing resource. Further, this improves a user experience of another user by preventing the user from overusing a cloud computing resource, thereby preventing the user from using a cloud computing resource that would otherwise be used by the other user.

FIGS. 1A-1D are diagrams of an overview of an example implementation 100 described herein. As shown in FIG. 1A, implementation 100 includes a resource analysis platform, a set of cloud computing resources (e.g., shown as cloud computing resources 1 and 2), and a set of client devices (e.g., shown as client devices 1 through 3). Assume, for example, that implementation 100 is a multitenant cloud computing environment, where the client devices 1 through 3 are multitenants of cloud computing resources 1 and 2. While implementation 100 shows three client devices for ease of explanation, there can be hundreds, thousands, etc. of client devices associated with zero or more organizations.

As shown in FIG. 1A, and by reference numbers 110, the set of client devices may utilize the set of cloud computing resources (e.g., memory, bandwidth, random-access memory (RAM), processor, software, etc.) to perform various operations, such as database queries, application program interface (API) calls, computational tasks, and/or the like.

A cloud computing environment may provide a static cloud computing resource (e.g., referred to herein as a static cloud computing resource). For example, a static cloud computing resource may include a cloud computing resource that is static in nature and where the amount of the cloud computing resource available to a client device is not based on, or determined with regard to, a runtime request for the cloud computing resource or an operation that uses the cloud computing resource. As a particular example, a static cloud computing resource may include cloud-based storage resources or bandwidth available to a client device.

Additionally, or alternatively, a cloud computing environment may provide a dynamic cloud computing resource (e.g., referred to herein as a dynamic cloud computing resource or a runtime cloud computing resource). For example, a dynamic cloud computing resource may be dynamic in nature where an amount of the cloud computing resource available to a client device depends on a runtime request for the cloud computing resource or an operation that uses the cloud computing resource. As a specific example, a dynamic cloud computing resource may include random access memory (RAM) provided to a client device. Static cloud computing resources and dynamic cloud computing resources may be associated with thresholds (e.g., static thresholds and dynamic thresholds, respectively), as described elsewhere herein.

As shown by reference number 120, the resource analysis platform, may receive information that identifies a resource utilization of a cloud computing resource. For example, resource analysis platform may receive, from the set of cloud computing resources, information that identifies a resource utilization of the set of cloud computing resources by the set of client devices. The information may identify a resource utilization of a static cloud computing resource and/or a dynamic cloud computing resource. The resource analysis platform may receive the information related to the resource utilization in real-time (e.g., as the set of client devices is utilizing the set of cloud computing resources).

The resource analysis platform may receive millions, billions, trillions, etc. of data elements when receiving the information. In this way, the resource analysis platform may receive a data set that cannot be processed manually or objectively by a human actor.

Figure 1B:
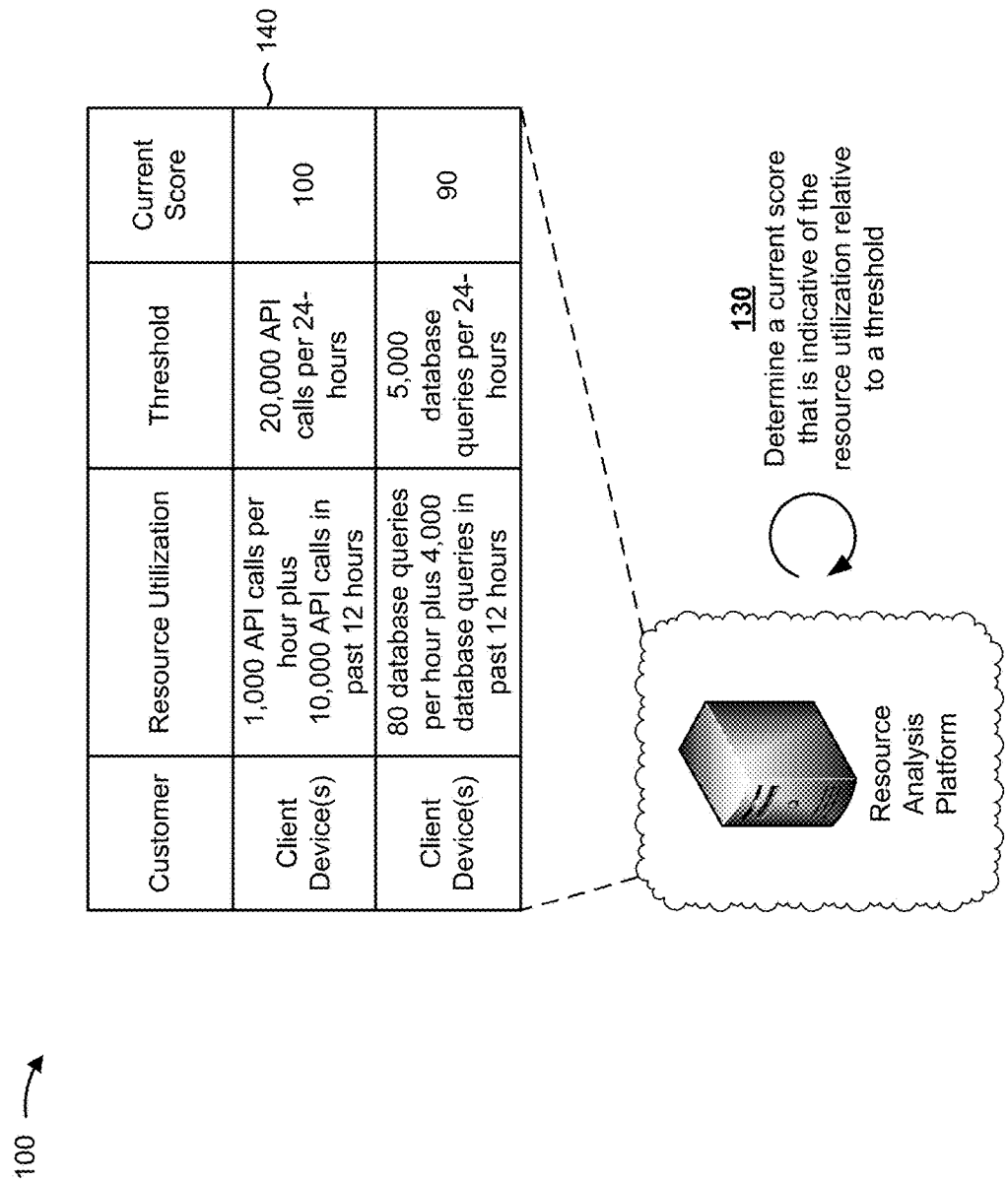

As shown in FIG. 1B, and by reference number 130, the resource analysis platform may determine a current score that is indicative of the resource utilization relative to a threshold (e.g., satisfying a threshold). For example, a license and/or contract related to utilizing the set of cloud computing resources may specify a threshold resource utilization that the set of client devices are permitted to use (e.g., on an individual client device basis, on a collective client device basis, etc.). The threshold may include a static threshold that indicates, for example, a total amount of a cloud computing resource (e.g., storage resources) available, an amount of a cloud computing resource available during a time period, and/or the like. Additionally, or alternatively, the threshold may include a dynamic threshold that indicates, for example, a particular amount of a cloud computing resource available for a particular type of operation, an amount of a cloud computing resource available per operation, and/or the like.

The resource analysis platform may determine the threshold dynamically based on demand for the set cloud computing resources (e.g., to ensure that each client device can utilize a threshold amount of cloud computing resources, based on prior usage of the cloud computing resource, etc.).

The current score may indicate whether the resource utilization is predicted to satisfy the threshold within a threshold amount of time, prior to a license renewal date, based on a current resource utilization, based on a historical resource utilization, and/or the like. The resource analysis platform may determine the current score using various techniques. For example, the resource analysis platform may determine the current score by determining whether a rate of resource utilization of the set of client devices may cause the set of client devices to use a threshold amount of the set of cloud computing resources within a threshold amount of time. Additionally, or alternatively, and as another example, the resource analysis platform may determine the current score by using machine learning to determine whether the resource utilization of the set of client devices is indicative of satisfying the threshold based on historical resource utilization of the set of client devices and/or another set of client devices.

Reference number 140 shows an example, of a result of determining a current score for a resource utilization. For example, the resource analysis platform may determine a current score of 100 for resource utilization in association with API calls, indicating that the set of client devices is predicted to satisfy a threshold of 20,000 API calls within a 24-hour period. The current score may be based on a quantity of API calls that the set of client devices has already performed and a rate at which the set of client devices is performing API calls. Additionally, or alternatively, and as another example, the resource analysis platform may determine a current score of 90 for resource utilization associated with database queries, indicating a high likelihood that the set of client devices is predicted to satisfy a threshold of 5,000 database queries within a 24-hour period. The current score may be based on a quantity of prior database queries that the set of client devices has already performed and a rate at which the set of client devices is performing database queries.

Figure 1C:
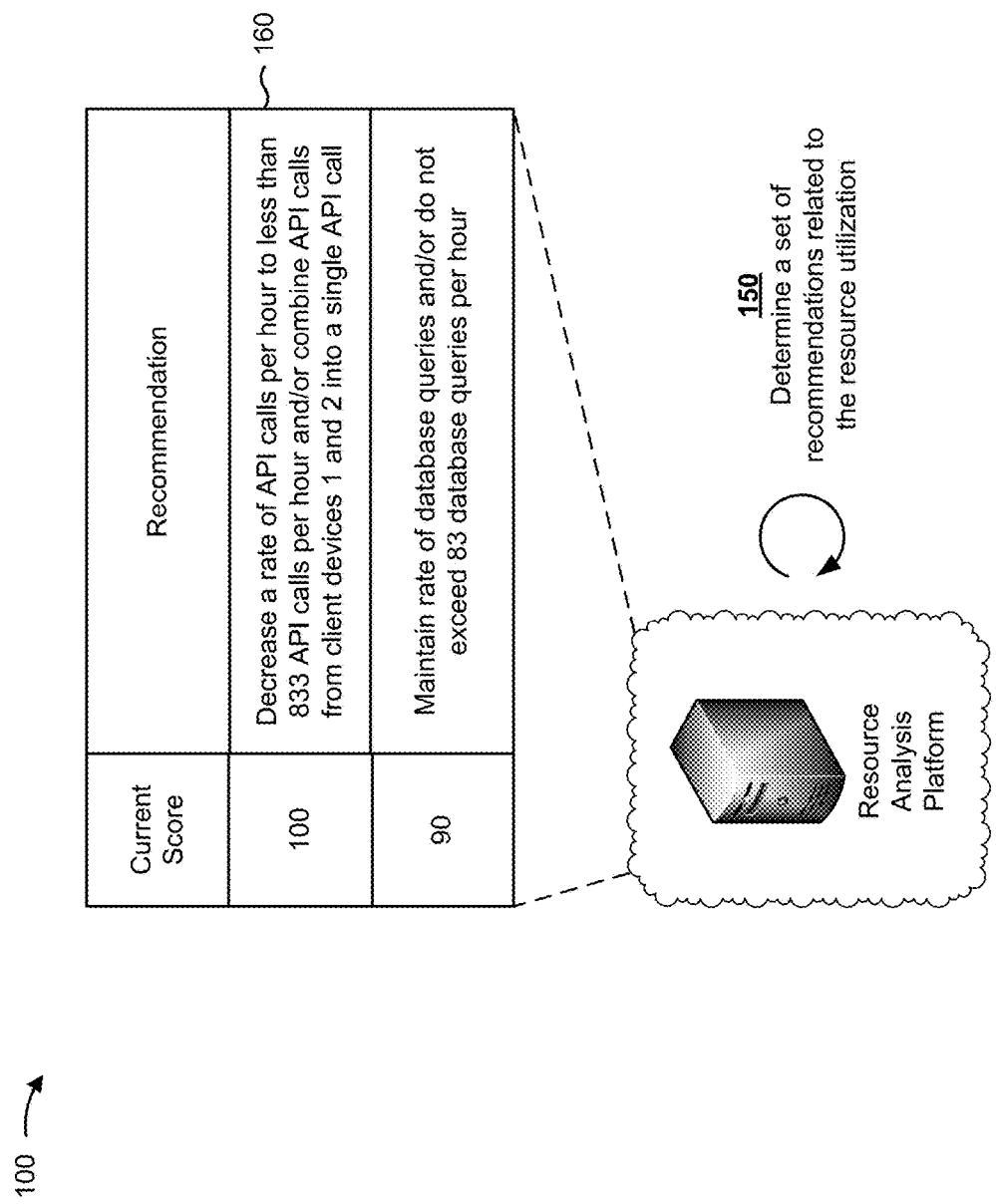

As shown in FIG. 1C, and by reference number 150, the resource analysis platform may determine a set of recommendations related to the resource utilization. For example, the resource analysis platform may determine the set of recommendations using artificial intelligence. The resource analysis platform may use artificial intelligence to identify a manner in which to modify resource utilization to prevent the resource utilization from satisfying a threshold (e.g., by modifying a rate of resource utilization), a manner in which to optimize resource utilization (e.g., by combining multiple resource utilizations into a single resource utilization, deduplicating resource utilizations, such as deduplicating requests for the same data, identifying resource utilizations that can be paused for a later time, etc.). In some cases, the set of recommendations for the resource utilization may be based on a current score associated with the resource utilization.

Reference number 160 shows an example of the set of recommendations that the resource analysis platform may determine. For example, the resource analysis platform may determine a recommendation to decrease a rate of API calls per hour to less than 833 API calls per hour so as to prevent the set of client devices from satisfying the threshold related to API calls. Additionally, or alternatively, the resource analysis platform may determine a recommendation to combine API calls from client devices 1 and 2 into a single API call (e.g., based on client devices 1 and 2 performing the same API call), so as to reduce a quantity of API calls from the set of client devices. Additionally, or alternatively, and as another example, the resource analysis platform may determine a recommendation to maintain a rate of database queries and/or to not exceed 83 database queries per hour so as to prevent the set of client devices from satisfying the threshold related to database queries. In this way, the resource analysis platform may determine a set of recommendations related to the resource utilization of the set of client devices to prevent the set of client devices from satisfying a threshold related to the resource utilization.

Figure 1D:
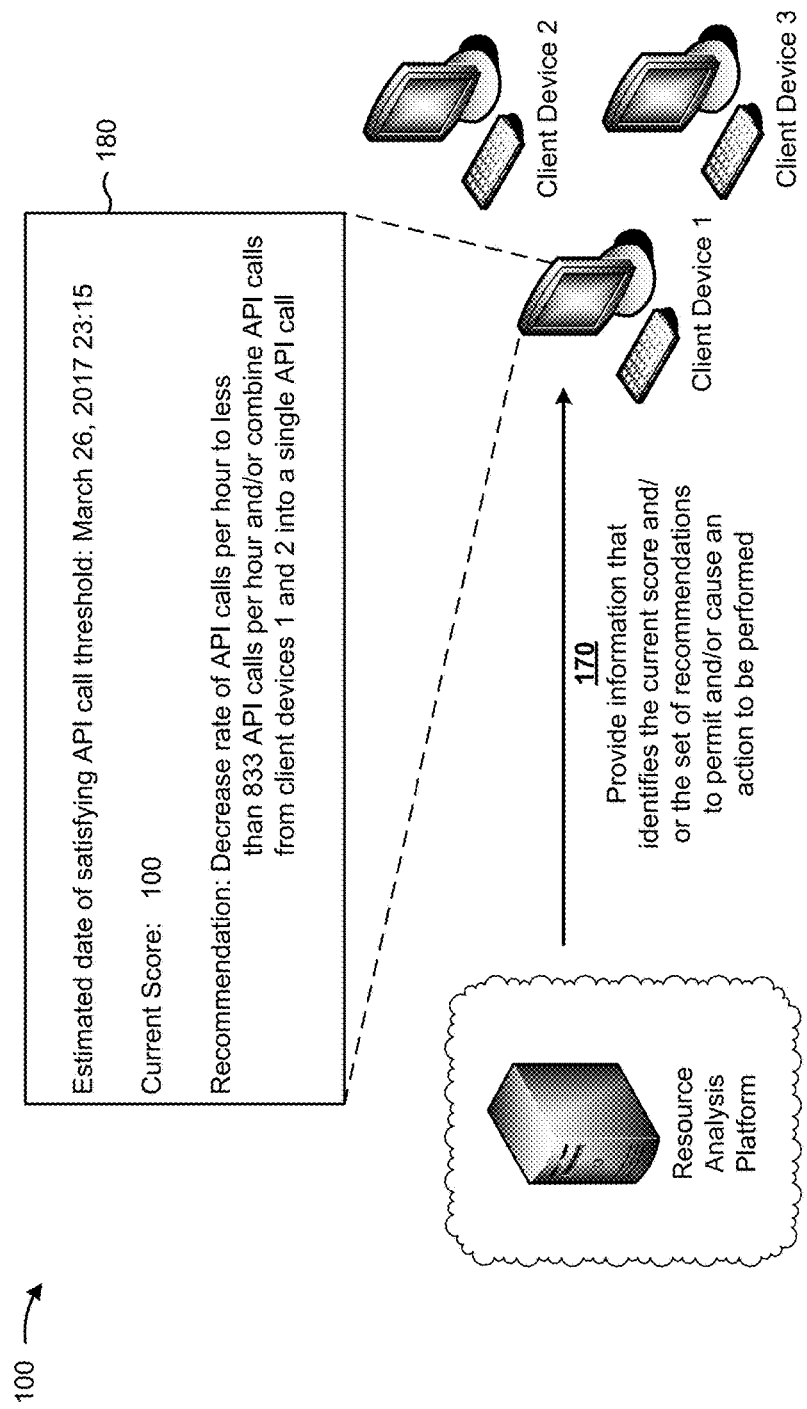

As shown in FIG. 1D, and by reference number 170, the resource analysis platform may provide information that identifies the current score and/or the set of recommendations to permit and/or cause an action to be performed. For example, the resource analysis platform may provide the information to the set of client devices. In some cases, the resource analysis platform may perform an action based on a determined current score and/or a determined recommendation. For example, the resource analysis platform may configure a setting of the set of client devices to cause the set of client devices to perform according to the set of recommendations. Additionally, or alternatively, and as another example, the resource analysis platform may configure the cloud computing resources to operate according to the set of recommendations (e.g., to prevent the set of client devices from satisfying a threshold resource utilization rate, to optimize the resource utilization of the set of client devices, etc.).

As shown by reference number 180, the set of client devices may provide information related to a result of analyzing the resource utilization for display. For example, the set of client devices may provide information identifying a date and/or time at which the threshold is predicted to be satisfied, a current score that is indicative of the threshold being satisfied, a set of recommendations that the resource analysis platform determined, and/or the like. The set of client devices may provide the information for display to permit a set of users of the set of client devices to configure the set of client devices to perform according to the set of recommendations.

In this way, the resource analysis platform may inform a user that the user is likely to satisfy a threshold associated with use of a cloud computing resource prior to the user satisfying the threshold. This prevents the user from paying a greater price for using the cloud computing resource than the average price the user pays for use of the cloud computing resource and improves a user experience of a user of a client device using the cloud computing resources. Additionally, this prevents the client device from losing access to the cloud computing resource based on the threshold being satisfied, thereby reducing or eliminating interruptions to an operation of the client device that is using the cloud computing resource.

Further, this conserves resources (e.g., memory resources, cloud computing resources, processing resources, etc.) of a cloud computing environment associated with the cloud computing resource by preventing the user from overusing a cloud computing resource. Further, this improves a user experience of another user by preventing the user from overusing a cloud computing resource, thereby preventing the user from using a cloud computing resource that would otherwise be used by the other user.

As indicated above, FIGS. 1A-1D are provided merely as an example. Other examples are possible and may differ from what was described with regard to FIGS. 1A-1D. Although implementation 100 was described in the context of a multitenant cloud computing environment, implementation 100 may apply equally to a multi-instance cloud computing environment, or another type of cloud computing architecture.

Figure 2:
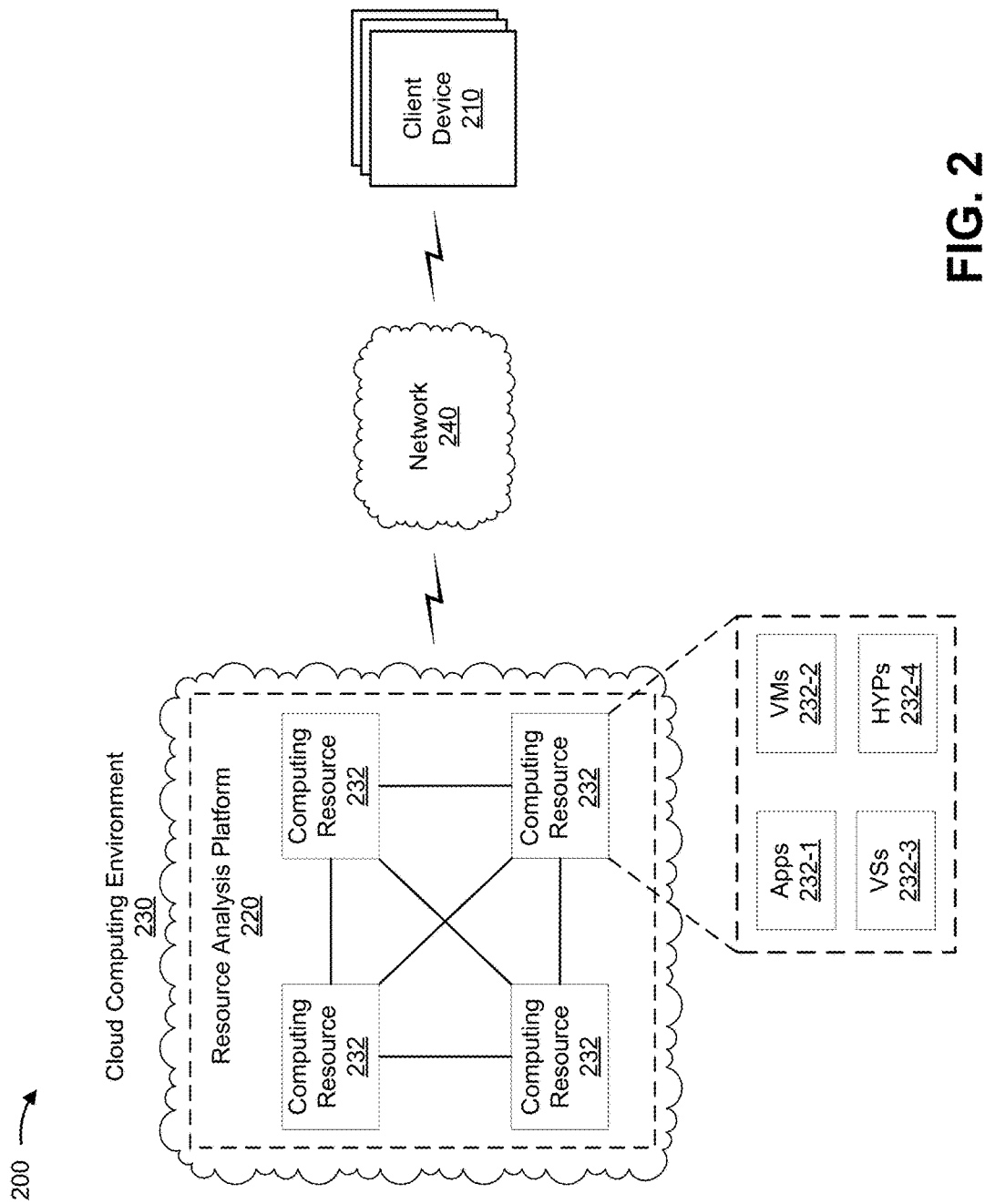
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include client device 210, resource analysis platform 220, cloud computing environment 230, a set of computing resources 232, and network 240. Devices of environment 200 may interconnect via wired connections, wireless connections, or a combination of wired and wireless connections.

Client device 210 includes one or more devices capable of receiving, generating, storing, processing, and/or providing information associated with analyzing data related to resource utilization of a cloud computing resource in a cloud computing environment (e.g., computing resource 232 in cloud computing environment 230). For example, client device 210 may include a desktop computer, a mobile phone (e.g., a smart phone or a radiotelephone), a laptop computer, a tablet computer, a gaming device, a wearable communication device (e.g., a smart wristwatch or a pair of smart eyeglasses), or a similar type of device. In some implementations, client device 210 may utilize computing resource 232 in cloud computing environment 230, as described elsewhere herein. Additionally, or alternatively, client device 210 may provide information related to an analysis of a resource utilization of computing resource 232 by client device 210, as described elsewhere herein. In some implementations, the set of cloud computing resources 232 that client device 210 utilizes to perform an operation may be associated with the same cloud computing environment 230 as resource analysis platform 220, or with a different cloud computing environment 230, as described herein.

Some implementations may include multiple client devices 210 associated with the same organization, associated with different organizations, and/or not associated with an organization. Some implementations may include hundreds, thousands, millions, etc. of client devices 210. Some implementations, described herein with respect to a single client device 210 may apply equally to implementations that include a group of client devices 210 (e.g., all client devices 210 associated with an organization or a subset of client devices 210 associated with a department of an organization, a geographic location, etc.). Some implementations, described herein with respect to a single client device 210, may apply to a single client device 210 of an organization, an individual, etc.

Resource analysis platform 220 includes one or more devices capable of analyzing data related to a resource utilization of a cloud computing resource (e.g., computing resource 232 in the same, or a different, cloud computing environment 230 as resource analysis platform 220). For example, resource analysis platform 220 may include a cloud server or a group of cloud servers. In some implementations, resource analysis platform 220 may be designed to be modular such that certain software components can be swapped in or out depending on a particular need. As such, resource analysis platform 220 may be easily and/or quickly reconfigured for different uses.

In some implementations, as shown, resource analysis platform 220 may be hosted in cloud computing environment 230. Notably, while implementations described herein describe resource analysis platform 220 as being hosted in cloud computing environment 230, in some implementations, resource analysis platform 220 may not be cloud-based (i.e., may be implemented outside of a cloud computing environment) or may be partially cloud-based. In some implementations, resource analysis platform 220 may be implemented within a first cloud computing environment 230 and may operate in connection with cloud computing resources 232 of a second cloud computing environment 230 (e.g., rather than resource analysis platform 220 and cloud computing resources 232 operating within the same cloud computing environment 230).

Cloud computing environment 230 includes an environment that hosts resource analysis platform 220. Cloud computing environment 230 may provide computation, software, data access, storage, and/or other services that do not require end-user knowledge of a physical location and configuration of a system and/or a device that hosts resource analysis platform 220. As shown, cloud computing environment 230 may include a group of computing resources 232 (referred to collectively as "computing resources 232" and individually as "computing resource 232").

Computing resource 232 includes one or more personal computers, workstation computers, server devices, or another type of computation and/or communication device. In some implementations, computing resource 232 may host resource analysis platform 220. The cloud resources may include compute instances executing in computing resource 232, storage devices provided in computing resource 232, data transfer devices provided by computing resource 232, etc. In some implementations, computing resource 232 may communicate with other computing resources 232 via wired connections, wireless connections, or a combination of wired and wireless connections.

As further shown in FIG. 2, computing resource 232 may include a group of cloud resources, such as one or more applications ("APPs") 232-1, one or more virtual machines ("VMs") 232-2, one or more virtualized storages ("VSs") 232-3, or one or more hypervisors ("HYPs") 232-4.

Application 232-1 includes one or more software applications that may be provided to or accessed by one or more devices of environment 200. Application 232-1 may eliminate a need to install and execute the software applications on devices of environment 200. For example, application 232-1 may include software associated with resource analysis platform 220 and/or any other software capable of being provided via cloud computing environment 230. In some implementations, one application 232-1 may send/receive information to/from one or more other applications 232-1, via virtual machine 232-2.

Virtual machine 232-2 includes a software implementation of a machine (e.g., a computer) that executes programs like a physical machine. Virtual machine 232-2 may be either a system virtual machine or a process virtual machine, depending upon use and degree of correspondence to any real machine by virtual machine 232-2. A system virtual machine may provide a complete system platform that supports execution of a complete operating system ("OS"). A process virtual machine may execute a single program, and may support a single process. In some implementations, virtual machine 232-2 may execute on behalf of a user (e.g., a user of client device 210), and may manage infrastructure of cloud computing environment 230, such as data management, synchronization, or long-duration data transfers.

Virtualized storage 232-3 includes one or more storage systems and/or one or more devices that use virtualization techniques within the storage systems or devices of computing resource 232. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 232-4 provides hardware virtualization techniques that allow multiple operating systems (e.g., "guest operating systems") to execute concurrently on a host computer, such as computing resource 232. Hypervisor 232-4 may present a virtual operating platform to the guest operating systems, and may manage the execution of the guest operating systems. Multiple instances of a variety of operating systems may share virtualized hardware resources.

Network 240 includes one or more wired and/or wireless networks. For example, network 240 may include a cellular network (e.g., a long-term evolution (LTE) network, a code division multiple access (CDMA) network, a 3G network, a 4G network, a 5G network, or another type of cellular network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
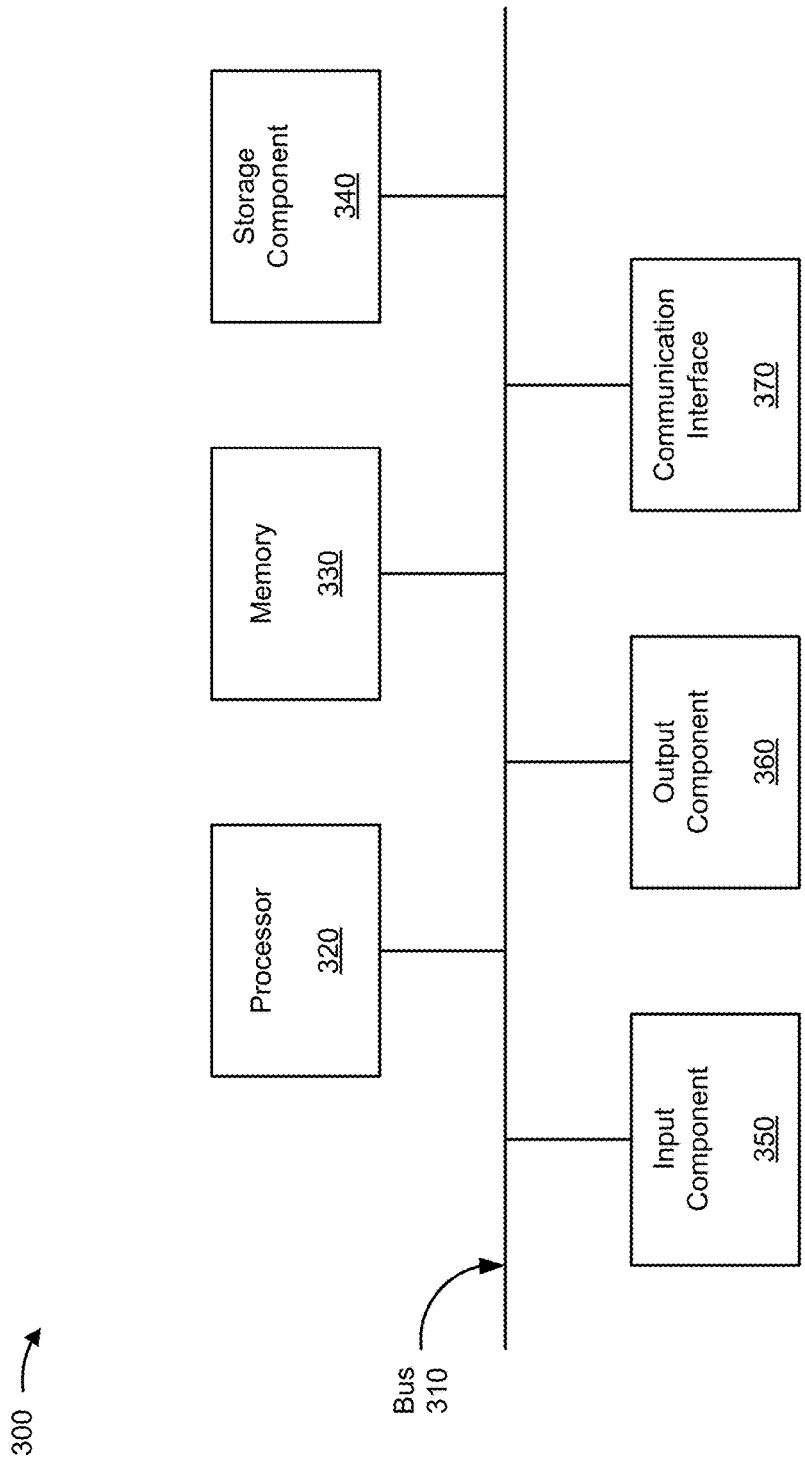
FIG. 3 is a diagram of example components of one or more devices of FIG. 2.

FIG. 3 is a diagram of example components of a device 300. Device 300 may correspond to client device 210 and/or resource analysis platform 220. In some implementations, client device 210 and/or resource analysis platform 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operations and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for analyzing resource utilization of a computing resource in a cloud computing environment. In some implementations, one or more process blocks of FIG. 4 may be performed by resource analysis platform 220. In some implementations, one or more process blocks of FIG. 4 may be performed by another device or a group of devices separate from or including resource analysis platform 220, such as client device 210.

As shown in FIG. 4, process 400 may include receiving information that identifies a resource utilization, by a client device, of a cloud computing resource (block 410). For example, resource analysis platform 220 may receive information that identifies a resource utilization, by client device 210, of cloud computing resource 232 (e.g., associated with the same, or a different, cloud computing environment 230 as resource analysis platform 220). In some implementations, resource analysis platform 220 may receive the information from cloud computing resource 232, periodically, according to a schedule, based on requesting the information, based on input from a user of client device 210 and/or resource analysis platform 220, and/or the like.

In some implementations, multiple client devices 210 may be accessing multiple cloud computing resources 232. Additionally, or alternatively, multiple client devices 210 may be accessing a single cloud computing resource 232. Additionally, or alternatively, a single client device 210 may be accessing multiple cloud computing resources 232. Additionally, or alternatively, a single client device 210 may be accessing a single cloud computing resource 232.

In some implementations, resource utilization may refer to use of a single cloud computing resource 232. Additionally, or alternatively, resource utilization may refer to use of multiple cloud computing resources 232.

In some implementations, cloud computing resource 232 may include a static resource (e.g., referred to herein as a static cloud computing resource 232). For example, cloud computing resource 232 may provide a static amount of resources that client device 210 can use, regardless of a transaction or operation that cloud computing resource 232 is performing. Continuing with the previous example, cloud computing resource 232 may include a static amount of storage resources, a static amount of bandwidth resources, and/or the like.

Additionally, or alternatively, cloud computing resource 232 may include a dynamic, or runtime, cloud computing resource (e.g., referred to herein as a dynamic cloud computing resource 232). For example, cloud computing resource 232 may provide a dynamic amount of resources at runtime, based on a request for a particular amount of cloud computing resources 232 from client device 210, based on a transaction or an operation that cloud computing resource 232 is performing, and/or the like. Continuing with the previous example, cloud computing resource 232 may provide a dynamic amount of RAM or processor resources depending on a transaction or operation that cloud computing resource 232 is performing. In some implementations, cloud computing resource 232 may be associated with a threshold (e.g., a static threshold associated with a static cloud computing resource 232 and/or a dynamic, or runtime, threshold associated with a dynamic cloud computing resource 232), as described elsewhere herein.

In some implementations, the information related to a resource utilization of cloud computing resource 232 by client device 210 may relate to a manner in which client device 210 is using cloud computing resource 232. For example, the information may identify a quantity of cloud computing resources 232 client device 210 is using, an amount of one or more cloud computing resources 232 that client device 210 is using, a rate at which client device 210 is using one or more cloud computing resources 232, and/or the like. As specific examples, the information may identify a quantity of database queries client device 210 has requested cloud computing resource 232 to perform (e.g., during a time period), an amount of data cloud computing resource 232 is obtaining for client device 210, a quantity of operations cloud computing resource 232 is performing concurrently for client device 210, a quantity of API calls cloud computing resource 232 is performing for client device 210, and/or the like.

In some implementations, resource analysis platform 220 may receive the information for multiple cloud computing resources 232 that multiple client devices 210 are utilizing. In some implementations, when receiving the information, resource analysis platform 220 may receive millions, billions, trillions, etc. of data elements related to resource utilization of millions, billions, trillions, etc. of cloud computing resources 232 by millions, billions, trillions, etc. of client devices 210. In this way, resource analysis platform 220 may receive a data set that cannot be processed manually or objectively by human operators.

In some implementations, cloud computing environment 230 may include a multitenant cloud computing environment 230. For example, in cloud computing environment 230, a single instance of software may run on cloud computing resource 232 and may serve multiple client devices 210 (e.g., multiple tenants of cloud computing environment 230) by providing each client device 210 with a dedicated share of the software instance (e.g., data, functionality, etc.). Conversely, in some implementations, cloud computing environment 230 may include a multi-instance cloud computing environment 230. For example, in cloud computing environment 230, multiple software instances may run on cloud computing resource 232 and may serve multiple client devices 210, by providing each client device 210 with access to a different software instance. In this way, the implementations described herein may apply to a variety of cloud computing environment 230 architectures.

In this way, resource analysis platform 220 may receive information that identifies a resource utilization, by client device 210, of cloud computing resource 232 to permit resource analysis platform 220 to determine a current score related to the resource utilization.

As further shown in FIG. 4, process 400 may include determining a current score, based on the information that identifies the resource utilization and information that identifies a threshold, that is indicative of the resource utilization relative to the threshold (block 420). For example, resource analysis platform 220 may determine a current score, based on the information that identifies the resource utilization and information that identifies a threshold, that is indicative of the resource utilization relative to the threshold. In some implementations, the current score may be indicative of a resource utilization satisfying a threshold.

In some implementations, a threshold may be associated with a resource utilization. For example, a threshold may indicate an amount of resource utilization that client device 210 is permitted to use (e.g., within a period of time, per operation, etc.). In some implementations, a threshold may include a static threshold (e.g., associated with a static cloud computing resource 232), where, for example, the threshold does not depend on a runtime request for cloud computing resource 232 and/or a type of transaction or operation that client device 210 requests at runtime. For example, a static threshold may include a daily threshold for a resource utilization, an hourly threshold for a resource utilization, a quantity of concurrent transactions or operations that client device 210 can request cloud computing resource 232 to perform, a threshold amount of storage resources available to client device 210, and/or the like.

Additionally, or alternatively, a threshold may include a dynamic, or runtime, threshold that is determined at runtime and/or that varies depending on a transaction or operation that cloud computing resource 232 is performing for client device 210 (e.g., referred to herein as a dynamic threshold). For example, a dynamic threshold may relate to an amount of RAM or processing resources available for performing a transaction or an operation, various database transactions (e.g., thresholds for a quantity of queries that can occur concurrently, an amount of data being queried at one time, etc.), and/or the like.

In some implementations, a threshold may be associated with use of one or more cloud computing resources 232. For example, a threshold may be associated with use of a single cloud computing resource 232. Additionally, or alternatively, and as another example, a threshold may be associated with use of multiple cloud computing resources 232.

In some implementations, resource analysis platform 220 may determine a threshold. In some implementations, resource analysis platform 220 may receive information related to a license or a contract for use of cloud computing resource 232 by client device 210, and may determine a threshold from the received information. For example, resource analysis platform 220 may receive information identifying an hourly threshold for resource utilization, a daily threshold for resource utilization, a total amount of cloud computing resource 232 available to a particular client device 210 and/or user of client device 210, and/or the like. In this way, resource analysis platform 220 may receive information related to a threshold based on receiving information related to a contract or a license associated with client device 210 and/or a user of client device 210.

Additionally, or alternatively, resource analysis platform 220 may receive text or a document (e.g., a contract agreement, a license agreement, etc.), and may process the text or the document using natural language processing, text analysis, computational linguistics, and/or the like to determine the threshold. For example, resource analysis platform 220 may process the text or the document to identify a term, a phrase, a number, and/or the like that indicates a threshold. In this way, resource analysis platform 220 may intelligently determine a threshold using text or a document related to a contract or a license associated with a resource utilization. This improves determination of a threshold, by providing flexibility with regard to determining a threshold. In addition, this conserves memory resources by reducing or eliminating a need for resource analysis platform 220 or another device to store information identifying the threshold.

In some implementations, resource analysis platform 220 may dynamically determine a threshold. In some implementations, resource analysis platform 220 may dynamically determine a threshold using machine learning, artificial intelligence, and/or the like. For example, resource analysis platform 220 may receive information indicating resource utilization by client device 210 (e.g., client device 210's current resource utilization of cloud computing resource 232) and may determine a threshold for client device 210's resource utilization based on a historical resource utilization of client device 210, a current resource utilization of one or more other client devices 210, a historical resource utilization of the one or more other client devices 210, and/or the like. In this way, resource analysis platform 220 can dynamically determine a threshold for a resource utilization, thereby improving management of a set of cloud computing resources 232.

In some implementations, resource analysis platform 220 may determine whether a resource utilization satisfies a threshold. For example, resource analysis platform 220 may receive information indicating an amount of storage capacity that client device 210 has used (e.g., storage capacity provided by cloud computing resource 232) and a threshold amount of storage capacity that client device 210 is permitted to use. Continuing with the previous example, resource analysis platform 220 may determine whether the amount of storage capacity that client device 210 has used satisfies the threshold amount of storage capacity client device 210 is permitted to use. In this way, client device 210 may determine whether a resource utilization satisfies a threshold.

In some implementations, resource analysis platform 220 may determine whether a resource utilization satisfies a set of thresholds. For example, resource analysis platform 220 may determine whether a resource utilization satisfies a first threshold, a second threshold, etc. Continuing with the previous example, each of the set of thresholds may be associated with different levels of resource utilization (e.g., a high, medium, or low levels of resource utilization). In some implementations, resource analysis platform 220 may provide various messages to client device 210 for display based on a threshold that is satisfied, as described elsewhere herein. In this way, resource analysis platform 220 may determine whether a resource utilization satisfies multiple thresholds, such as to determine whether the resource utilization is a high level of resource utilization, a medium level of resource utilization, or a low level of resource utilization. This permits resource analysis platform 220 to better manage a resource utilization associated with client device 210 to prevent the resource utilization from satisfying a threshold.

In some implementations, resource analysis platform 220 may determine a current score that is indicative of a resource utilization satisfying a threshold. For example, a current score may indicate a likelihood of a resource utilization satisfying a threshold. Continuing with the previous example, a current score may indicate a likelihood of using a total amount of cloud computing resource 232, an amount of cloud computing resource 232 in a threshold amount of time, an amount of cloud computing resource 232 allocated for a transaction or operation, and/or the like. In some implementations, a current score may include a number within a range of numbers that indicates a likelihood of a resource utilization satisfying a threshold, an amount of cloud computing resources 232 consumed or remaining, and/or the like (e.g., a range from zero to 100 where zero indicates a low likelihood of satisfying a threshold and 100 indicates a high likelihood of satisfying the threshold, where zero indicates that cloud computing resource 232 is fully consumed or fully available, etc.).

In some implementations, resource analysis platform 220 may determine a current score using information related to a resource utilization. For example, resource analysis platform 220 may determine a current score using information related to a rate of a resource utilization (e.g., an amount of resource utilization per a particular time period). Additionally, or alternatively, and as another example, resource analysis platform 220 may determine a current score using information related to an amount of cloud computing resource 232 that client device 210 has used in a particular time period (e.g., the last 24 hours, during the current day of the week or month of the year, etc.) and/or is using for a transaction or operation. Additionally, or alternatively, resource analysis platform 220 may determine a current score using information identifying a threshold related to a resource utilization.

As a specific example, resource analysis platform 220 may determine a current score using information identifying an amount of cloud computing resource 232 that client device 210 has used (e.g., an amount of storage resources), a rate at which client device 210 is currently using cloud computing resource 232 (e.g., a rate at which client device 210 is using storage resources net of additions to and deletions from the storage resources), and/or a threshold related to cloud computing resource 232 (e.g., a threshold amount of storage resources that client device 210 is permitted to use). Continuing with the previous example, resource analysis platform 220 may determine the current score based on client device 210 using a percentage of the threshold (e.g., where the current score indicates a percentage of available storage resources consumed or remaining), based on an amount of time during which client device 210 consumed cloud computing resource 232, an amount of time remaining before client device 210 consumes remaining cloud computing resource 232 (e.g., based on a rate of a resource utilization of cloud computing resource 232), and/or the like.

In some implementations, resource analysis platform 220 may determine a prediction of a future score related to cloud computing resource 232 (e.g., may determine a prediction). For example, resource analysis platform 220 may predict an amount of time remaining before client device 210 uses a threshold amount of cloud computing resource 232, a date and/or time at which client device 210 is predicted to use a remaining amount of cloud computing resources 232, a quantity of transactions or operations client device 210 may have cloud computing resource 232 perform prior to using a remaining amount of cloud computing resource 232, and/or the like. In some implementations, a prediction of a future score may be the same as a current score, may be based on a current score (or a current score may be based on a prediction of a future score), and/or the like.

In some implementations, resource analysis platform 220 may determine a prediction of a future score in a manner similar to that described above with respect to a current score. For example, resource analysis platform 220 may predict a date and/or time at which client device 210 is expected to use a threshold amount of cloud computing resource 232 based on an amount of cloud computing resource 232 client device 210 has already used, a rate at which client device 210 is using cloud computing resource 232, and/or the like.

Additionally, or alternatively, resource analysis platform 220 may determine a prediction of a future score related to a resource utilization of cloud computing resource 232 using a technique. For example, resource analysis platform 220 may determine a prediction of a future score using machine learning, artificial intelligence, and/or the like. Continuing with the previous example, resource analysis platform 220 may predict a date and/or time that client device 210 is to use a remaining amount of cloud computing resource 232 based on information identifying a type of transaction cloud computing resource 232 is performing, a particular type of cloud computing resource 232 client device 210 is using, and/or the like (e.g., where resource analysis platform 220 is trained using information related resource utilization by other client devices 210). In this way, resource analysis platform 220 may more accurately determine a prediction of a future score related to a resource utilization of cloud computing resource 232 by client device 210 (e.g., relative to determining a prediction of a future score without using machine learning, artificial intelligence, etc.).

In some implementations, when determining a prediction of a future score, resource analysis platform 220 may determine the prediction of the future score by accessing data in a pre-defined data store and performing a comparison of the pre-defined data and other information. For example, resource analysis platform 220 may compare a current score and a threshold with a subset of the data in the pre-defined data store. In some implementations, for example, data in the pre-defined data store may identify various predictions of future scores and corresponding current scores and thresholds. In some implementations, at least some of the data in the pre-defined data store may be alterable by an authorized user.

In some implementations, resource analysis platform 220 may receive information identifying a manner in which client device 210 is expected to use cloud computing resource 232 (e.g., types of transactions or operations client device 210 may have cloud computing resource 232 perform, whether a resource utilization is associated with an enterprise resource utilization or a personal resource utilization, etc.). For example, resource analysis platform 220 may receive the information by requesting that a user of client device 210 input the information when the user purchases access to cloud computing resource 232, when a threshold amount of cloud computing resource 232 has been used, when client device 210 uses cloud computing resource 232 in a manner that differs from a previous pattern of use (e.g., a different pattern of transactions, using a different pattern, or combination, of cloud computing resources 232, etc.), and/or the like. In some implementations, resource analysis platform 220 may receive information related to an expected resource utilization, or expected usage of a cloud computing resource, in the form of text (e.g., of a message such as a short message service (SMS) message or an email), and may process the text using natural language processing, computational linguistics, text analysis, and/or the like to identify the information, in a manner similar to that described above.

In some implementations, resource analysis platform 220 may use information related to an expected resource utilization to modify a prior prediction of a future score or current score (e.g., to account for an expected resource utilization differing from a past resource utilization). For example, resource analysis platform 220 may predict additional resource utilization or reduced resource utilization based on information identifying an expected resource utilization. In this way, resource analysis platform 220 can determine a more accurate prediction of a future score and can better manage resource utilization of various cloud computing resources 232.

In this way, resource analysis platform 220 may determine a current score that is indicative of the resource utilization relative to a threshold, thereby facilitating generation of a recommendation related to the resource utilization, as described below.

As further shown in FIG. 4, process 400 may include determining, based on the current score, a set of recommendations related to the resource utilization (block 430). For example, resource analysis platform 220 may determine, based on the current score, a set of recommendations related to the resource utilization (e.g., to prevent a resource utilization from satisfying a threshold).

In some implementations, a set of recommendations may relate to a resource utilization. For example, a set of recommendations may relate to reducing or increasing a resource utilization, a rate of resource utilization, and/or the like. Additionally, or alternatively, a set of recommendations may relate to cloud computing resource 232. For example, resource analysis platform 220 may determine a recommendation to use a different cloud computing resource 232 (e.g., based on a transaction or operation that cloud computing resource 232 is performing on behalf of client device 210), a different combination of cloud computing resources 232 (e.g., a combination of cloud computing resources 232 that consumes less total cloud computing resources 232), and/or the like.

Additionally, or alternatively, a set of recommendations may relate to a transaction or an operation that client device 210 is causing cloud computing resource 232 to perform. For example, resource analysis platform 220 may determine a set of recommendations to perform a different transaction or operation, to reduce a quantity of transactions or operations, to pause a transaction or operation (e.g., for a threshold amount of time, until a user of client device 210 has renewed a contract or a license, etc.).

In some implementations, resource analysis platform 220 may determine a first recommendation when a current score satisfies a first threshold and a second recommendation when the current score satisfies a second threshold. For example, resource analysis platform 220 may determine a first recommendation to maintain a rate of resource utilization when a current score satisfies a first threshold and may determine a second recommendation to reduce the rate of resource utilization when the current score satisfies a second threshold. In this way, resource analysis platform 220 may optimize determination of a recommendation, thereby resulting in better recommendations, recommendations that better match a resource utilization, and/or the like.

In some implementations, resource analysis platform 220 may determine a set of recommendations related to cloud computing environment 230. For example, resource analysis platform 220 may determine a set of recommendations to activate one or more additional cloud computing resources 232, shift or reorganize one or more cloud computing resources 232 (e.g., move cloud computing resources 232 from one virtual machine or geographic location to another virtual machine or geographic location, such as by activating one or more new cloud computing resources 232 and deactivating one or more old cloud computing resources 232).

In some implementations, when determining a set of recommendations, resource analysis platform 220 may determine a set of recommendations by accessing data in a pre-defined data store. For example, resource analysis platform 220 may compare a current score and a prediction of a future score with a subset of data included in the pre-defined data store. In some implementations, for example, the pre-defined data store may include information identifying various recommendations and corresponding current scores and/or predictions of future scores.

In some implementations, resource analysis platform 220 may determine a priority for a set of recommendations. For example, if resource analysis platform 220 determines multiple recommendations for a resource utilization, or for multiple resource utilizations (e.g., of client device 210, of multiple client devices 210, etc.), then resource analysis platform 220 may determine a priority for the multiple recommendations.

In some implementations, resource analysis platform 220 may determine a priority based on a current score with which a recommendation is associated. For example, assuming that a first current score indicates a higher likelihood of a first resource utilization satisfying a threshold than a second current score associated with a second resource utilization, resource analysis platform 220 may prioritize a first recommendation associated with the first current score higher than a second recommendation associated with the second current score. Additionally, or alternatively, resource analysis platform 220 may determine a priority based on user input received from client device 210. For example, a user of client device 210 may input information indicating a manner in which resource analysis platform 220 is to prioritize a set of recommendations.

Additionally, or alternatively, resource analysis platform 220 may determine a priority based on cloud computing resource 232. For example, resource analysis platform 220 may determine a priority for a recommendation related to a resource utilization of a particular type of cloud computing resource 232 (e.g., prioritize a resource utilization of a static cloud computing resource 232 higher than a resource utilization of a dynamic cloud computing resource 232, or vice versa), based on a demand for various cloud computing resources 232 (e.g., prioritize a recommendation for cloud computing resource 232 that has a threshold demand from multiple client devices 210), based on a predicted impact of the recommendation (e.g., a predicted impact on a current score, whether the recommendation will prevent a resource utilization from satisfying a threshold, etc.), and/or the like.

In some implementations, resource analysis platform 220 may determine a set of recommendations using a technique. For example, resource analysis platform 220 may determine a set of recommendations using artificial intelligence, machine learning, and/or the like. Continuing with the previous example, resource analysis platform 220 may use artificial intelligence, machine learning, and/or the like to process information related to actions that users of various client devices 210 performed based on a recommendation related to a resource utilization and/or a notification related to resource utilization (e.g., historical information identifying historical actions) to identify potential recommendations for a resource utilization of a particular client device 210. In this way, resource analysis platform 220 may intelligently determine a set of recommendations for a resource utilization of client device 210.

Additionally, or alternatively, and continuing still with the previous example, resource analysis platform 220 may determine a set of recommendations for a resource utilization of client device 210 based on information related to recommendations determined for other resource utilizations of other client devices 210 (e.g., other resource utilizations that include use of a similar combination of cloud computing resources 232, client devices 210 that are requesting cloud computing resource 232 to perform a similar transaction or operation, etc.). This improves a set of recommendations that resource analysis platform 220 determines (e.g., relative to determining a set of recommendations without regard to information related to other client devices 210).

Additionally, or alternatively, resource analysis platform 220 may receive information related to a first current score for a first resource utilization and may use artificial intelligence, machine learning, and/or the like to determine a set of characteristics of the first resource utilization that contributed to the first current score. For example, resource analysis platform 220 may determine a set of characteristics such as the types of cloud computing resources 232 used, a quantity of cloud computing resources 232 used, a quantity of client devices 210 using cloud computing resource 232, a rate of the first resource utilization, a quantity of transactions and/or operations cloud computing resource 232 is performing, a type of transaction and/or operation cloud computing resource 232 is performing, and/or the like.

In some implementations, resource analysis platform 220 may determine a set of recommendations for a second resource utilization based on determining the set of characteristics for the first resource utilization that contributed to the first current score. For example, resource analysis platform 220 may determine a set of recommendations for a second resource utilization that, when implemented, cause the second resource utilization to have the same or similar characteristics as the first resource utilization. In this way, resource analysis platform 220 may intelligently determine a set of recommendations for a resource utilization. This improves a set of recommendations that resource analysis platform 220 determines (e.g., relative to determining a set of recommendations without regard to information related to another resource utilization).

In this way, resource analysis platform 220 may determine a set of recommendations to facilitate performance of an action related to the resource utilization, as described below.

As further shown in FIG. 4, process 400 may include providing information that identifies the current score and/or the set of recommendations to permit and/or cause an action, related to the resource utilization, to be performed (block 440). For example, resource analysis platform 220 may provide information that identifies the current score and/or the set of recommendations to permit and/or cause an action, related to the resource utilization, to be performed. In some implementations, resource analysis platform 220 may provide the information that identifies the current score and/or the set of recommendations to client device 210 for display, periodically, according to a schedule, based on a request from client device 210, when a current score satisfies a threshold, and/or the like.

In some implementations, resource analysis platform 220 may provide the information related to the current score and/or the set of recommendations to permit and/or cause an action to be performed. For example, resource analysis platform 220 may provide the information related to the current score and/or the set of recommendations to permit a user of client device 210 to perform an action based on the set of recommendations, to cause client device 210 to perform an action based on the set of recommendations, to cause cloud computing environment 230 to perform an action based on the set of recommendations, and/or the like. Continuing with the previous example, resource analysis platform 220 may provide the information to permit and/or cause client device 210 and/or a user of client device 210 to use a particular rate of a resource utilization, to use a different set of cloud computing resources 232, to reschedule a resource utilization for a different date and/or time, and/or the like.

In some implementations, resource analysis platform 220 may perform an action other than providing the information related to the current score and/or the set of recommendations. For example, resource analysis platform 220 may perform an action to implement the set of recommendations, to cause a resource utilization to have a particular current score, and/or the like. In some implementations, the action may include providing a set of instructions to client device 210 and/or cloud computing resource 232. For example, resource analysis platform 220 may provide a set of instructions to cause client device 210 to use cloud computing resource 232 at a particular rate, to cause client device 210 to use a particular combination of cloud computing resources 232, to cause cloud computing resource 232 to prevent client device 210 from using a particular amount of cloud computing resource 232, to cause cloud computing resource 232 to prevent client device 210 from using cloud computing resource 232 at a particular rate, to cause a device to modify a resource utilization of the device (e.g., such that a current score for the resource utilization satisfies a threshold), and/or the like.

In some implementations, resource analysis platform 220 may perform a different action. In some implementations, resource analysis platform 220 may generate an order or an offer for additional access to cloud computing resource 232. For example, resource analysis platform 220 may renew a license and/or a contract for access to cloud computing resource 232 when a current score for a resource utilization satisfies a threshold (e.g., to provide client device 210 with access to an additional amount of cloud computing resource 232 so that the resource utilization does not satisfy a threshold).

Additionally, or alternatively, resource analysis platform 220 may generate a report. For example, resource analysis platform 220 may generate a report that includes information identifying a current score, a resource utilization, and/or the like. In some implementations, resource analysis platform 220 may provide the report to client device 210 for display (e.g., client device 210 using cloud computing resource 232, client device 210 associated with a network administrator, etc.).

Additionally, or alternatively, resource analysis platform 220 may send a message. For example, resource analysis platform 220 may send a text message, an SMS message, a multimedia messaging service (MMS) message, an email, and/or the like to client device 210. In some implementations, the message may include the information related to the recommendation, the current score, an action resource analysis platform 220 is to perform, and/or the like.

Additionally, or alternatively, resource analysis platform 220 may schedule a meeting. For example, resource analysis platform 220 may schedule a meeting between a user of client device 210 and a network administrator, such as to discuss a resource utilization, to obtain additional access to cloud computing resource 232, and/or the like. In some implementations, resource analysis platform 220 may schedule the meeting using electronic calendars associated with the user of client device 210 and the network administrator to identify an available time for a meeting. In some implementations, resource analysis platform 220 may generate a calendar item (e.g., an appointment, a calendar invite, etc.) for the meeting and may provide the calendar item to client device 210, populate an electronic calendar with the calendar item, and/or the like.

Additionally, or alternatively, resource analysis platform 220 may perform analytics related to a resource utilization, a current score, and/or the like. For example, resource analysis platform 220 may perform analytics related to a resource utilization of client device 210 over a period of time, such as to determine a recommendation related to the resource utilization. Additionally, or alternatively, and as another example, resource analysis platform 220 may perform analytics related to a resource utilization of client device 210, such as to determine a recommendation related to another client device 210.

Additionally, or alternatively, resource analysis platform 220 may store information related to a set of recommendations that resource analysis platform 220 determined, a resource utilization, a current score for the resource utilization, and/or the like using memory resources associated with resource analysis platform 220, such as to permit resource analysis platform 220 to perform machine learning on the information. In some implementations, when storing the information, resource analysis platform 220 may aggregate and/or merge the information with other information, deduplicate the information, and/or identify missing or corrupted information and obtain replacement information (e.g., using metadata related to the information, querying the information, cross-referencing the information to identify missing/corrupted information, and/or the like). This conserves memory resources of resource analysis platform 220 and/or conserves processing resources of resource analysis platform 220 by reducing errors in the information, reducing duplicate information, and/or the like. In some implementations, resource analysis platform 220 may use a big data tool to aggregate and/or merge the information (e.g., to aggregate and/or merge millions, billions, trillions, etc. of data elements). In this way, resource analysis platform 220 may process a data set that cannot be processed manually or objectively by a human actor.

In this way, resource analysis platform 220 may provide information related to the current score and/or the resource utilization to permit and/or cause an action, related to the resource utilization, to be performed.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Some implementations, described herein, provide a resource analysis platform that is capable of receiving information that identifies a resource utilization of a cloud computing resource, determining a current score that is indicative of the resource utilization relative to a threshold, determining a set of recommendations related to the resource utilization, and/or providing information related to the current score and/or the set of recommendations to permit and/or cause an action, related to the resource utilization, to be performed. In this way, the resource analysis platform may inform a user that the user is likely to satisfy a threshold associated with use of a cloud computing resource prior to the user satisfying the threshold.

This prevents the user from paying a greater price for using the cloud computing resource than the average price the user pays for use of the cloud computing resource and improves a user experience of a user of a client device using the cloud computing resources. Additionally, this prevents the user from losing access to the cloud computing resource based on the user satisfying the threshold, thereby reducing or eliminating interruptions to an operation of a client device that is using the cloud computing resource. Further, this conserves resources (e.g., memory resources, cloud computing resources, processing resources, etc.) of a cloud computing environment associated with the cloud computing resource by preventing the user from overusing a cloud computing resource. Further, this improves a user experience of another user by preventing the user from overusing a cloud computing resource, thereby preventing the user from using a cloud computing resource that would otherwise be used by the other user.

Although some implementations were described in the context of a multitenant cloud computing environment, the implementations apply equally to other types of cloud computing environments, such as multi-instance cloud computing environments.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
receive information that identifies a resource utilization, by another device, of a cloud computing resource;
determine a current score based on the information that identifies the resource utilization and information that identifies a threshold,
the current score indicating the resource utilization relative to the threshold;
determine a date or time at which the resource utilization is to satisfy the threshold;
determine, based on determining the date or the time at which the resource utilization is to satisfy the threshold and based on the current score and based on the threshold, a prediction of a future score related to the resource utilization,
the prediction of the future score relating to satisfaction of the threshold;
perform machine learning on information that identifies another resource utilization to produce another score for the other resource utilization,
the other score indicating the other resource utilization relative to the threshold, and
the other resource utilization being different from the resource utilization;
determine, based on the other score for the other resource utilization and historical information indicating one or more historical actions associated with adjusting historical resource utilization and at least one of the current score or the prediction of the future score, a set of recommendations,
the set of recommendations including a first recommendation specifying a first action to adjust the resource utilization, and
the set of recommendations including a second recommendation specifying a second action to adjust the resource utilization, the second action being different from the first action; and provide information that identifies the set of recommendations to permit or cause at least one of the first action or the second action to be performed.

2. The device of claim 1, where the one or more processors are further to:
   determine a rate of the resource utilization; and
   where the one or more processors, when determining the current score, are to:
      determine the current score based on the rate of the resource utilization, the information that identifies the resource utilization, or the information that identifies the threshold.

3. The device of claim 1, where the one or more processors are further to:
   determine an amount of time remaining before the resource utilization satisfies the threshold; and
   where the one or more processors, when determining the prediction of the future score, are to:
      determine the prediction of the future score using information identifying the amount of time remaining before the resource utilization satisfies the threshold.

4. The device of claim 1, where the one or more processors are further to:
   receive information related to a contract or a license associated with the other device;
   determine the threshold using the information related to the contract or the license; and
   where the one or more processors, when determining the current score, are to:
      determine the current score after determining the threshold.

5. The device of claim 1, where the one or more processors are further to:
   receive the historical information,
      the historical information indicating another historical resource utilization of the other device; and
   where the one or more processors, when determining the prediction of the future score, are to:
      determine the prediction of the future score based on the other historical information.

6. The device of claim 1, where the one or more processors, when determining the prediction of the future score, are to:
   determine the prediction of the future score related to the resource utilization by accessing data in a pre-defined data store and comparing the current score and the threshold with a subset of the data.

7. The device of claim 6, where at least some of the data in the pre-defined data store is alterable by an authorized user.

8. The device of claim 6, where the one or more processors, when determining the set of recommendations, are to:
   determine the set of recommendations by accessing other data in another pre-defined data store and comparing the current score and the prediction of the future score with the subset of the data.

9. A method, comprising:
   receiving, by a device, information that identifies a resource utilization, by another device, of a cloud computing resource;
   determining, by the device, a date or time at which the resource utilization is to satisfy a threshold;
   determining, by the device, a score based on determining the date or the time at which the resource utilization is to satisfy the threshold, based on the information that identifies the resource utilization, and based on information that identifies the threshold,
      the score indicating a likelihood that the resource utilization is to satisfy the threshold;
   performing, by the device, machine learning on information that identifies another resource utilization to produce another score for the other resource utilization,
      the other score indicating another likelihood that the other resource utilization is to satisfy the threshold, and
      the other resource utilization being different from the resource utilization;
   determining, by the device and based on historical information indicating one or more historical actions associated with adjusting historical resource utilization, based on the other score for the other resource utilization, a set of recommendations to prevent the resource utilization from satisfying the threshold,
      the set of recommendations including a first recommendation specifying a first action to adjust the resource utilization, and
      the set of recommendations including a second recommendation specifying a second action to adjust the resource utilization,
         the second action being different from the first action; and
   providing, by the device, information that identifies the set of recommendations to permit or cause at least one of the first action or the second action to be performed.

10. The method of claim 9, further comprising:
determining whether the resource utilization satisfies a set of thresholds,
   the set of thresholds being associated with a set of levels of resource utilization; and
where determining the score comprises:
   determining the score based on determining whether the resource utilization satisfies the set of thresholds.

11. The method of claim 9, further comprising:
receiving a document related to the threshold;
processing the document using a technique,
   the technique including:
      a natural language processing technique,
      a computational linguistics technique, or
      a text analysis technique;
determining the threshold based on processing the document using the technique; and
where determining the score comprises:
   determining the score after determining the threshold.

12. The method of claim 9, further comprising:
receiving the historical information,
   the historical information further indicating a historical action, of the one or more historical actions, performed to prevent another historical resource utilization from satisfying a historical threshold; and
where determining the set of recommendations further comprises:
   determining the set of recommendations based on the historical action.

13. The method of claim 9, further comprising:
providing a set of instructions to the other device to cause the other device to implement the at least one of the first action or the second action.

14. The method of claim 9, further comprising:
determining the threshold using information identifying a type of the cloud computing resource being used; and where determining the score comprises:
  determining the score based on determining the threshold using the information identifying the type of the cloud computing resource being used.

15. A non-transitory computer-readable medium storing instructions, the instructions comprising:
  one or more instructions that, when executed by one or more processors, cause the one or more processors to:
    receive information that identifies one or more resource utilizations, by one or more other devices, of one or more cloud computing resources;
    determine one or more scores based on the information that identifies the one or more resource utilizations and information that identifies one or more thresholds related to the one or more resource utilizations, the one or more scores indicating the one or more resource utilizations satisfying the one or more thresholds,
      the one or more thresholds including:
        one or more static thresholds, or
        one or more dynamic thresholds;
    determine a date or time at which the resource utilization is to satisfy at least one of the one or more thresholds;
    determine, based on determining the date or the time at which the resource utilization is to satisfy the at least one of the one or more thresholds, one or more predictions related to the one or more resource utilizations,
      the one or more predictions relating to the one or more resource utilizations satisfying the one or more thresholds;
    perform machine learning on information that identifies another resource utilization to produce another score for the other resource utilization,
      the other score indicating the other resource utilization satisfying the one or more thresholds, and
      the other resource utilization being different from the one or more resource utilizations;
    determine, based on the other score for the other resource utilization and historical information indicating one or more historical actions associated with adjusting resource utilization and at least one of the one or more scores or the one or more predictions, one or more recommendations related to preventing the one or more resource utilizations from satisfying the one or more thresholds, the one or more recommendations including:
      a first recommendation specifying a first action to adjust the resource utilization, and
      a second recommendation specifying a second action to adjust the resource utilization,
        the second action being different from the first action; and
    perform at least one of the first action or the second action based on the one or more recommendations.

16. The non-transitory computer-readable medium of claim 15, where the one or more instructions, when executed by the one or more processors, further cause the one or more processors to:
  receive information identifying an expected usage of the one or more cloud computing resources; and
  where the one or more instructions, that cause the one or more processors to determine the one or more predictions, cause the one or more processors to:
    determine the one or more predictions based on the information identifying the expected usage of the one or more cloud computing resources.

17. The non-transitory computer-readable medium of claim 15, where the one or more instructions, when executed by the one or more processors, further cause the one or more processors to:
  perform machine learning on information identifying at least one of:
    the one or more cloud computing resources that the one or more other devices are using, or
    one or more transactions for which the one or more other devices are using the one or more cloud computing resources; and
  where the one or more instructions, that cause the one or more processors to determine the one or more predictions, cause the one or more processors to:
    determine the one or more predictions based on performing machine learning on the information identifying the at least one of:
      the one or more cloud computing resources, or
      the one or more transactions.

18. The non-transitory computer-readable medium of claim 15, where the one or more instructions, when executed by the one or more processors, further cause the one or more processors to:
  determine a priority of the one or more recommendations; and
  where the one or more instructions, that cause the one or more processors to perform the at least one of the first action or the second action, cause the one or more processors to:
    perform the at least one of the first action or the second action based on the priority of the one or more recommendations.

19. The device of claim 1, where the one or more processors are further to:
  determine a measure of priority associated with a recommendation of the set of recommendations,
    the measure of priority being based on a predicted impact at least one of the current score or the future score; and
  prioritize the recommendation based on the measure of priority.

20. The device of claim 1, where the one or more processors are further to:
  determine the threshold using information identifying a type of the cloud computing resource being used; and
  where the one or more processors, when determining the prediction of the future score, are to:
    determine the prediction of the future score based on determining the threshold using the information identifying the type of the cloud computing resource being used.

* * * * *